United States Patent [19]

Dorf et al.

[11] Patent Number: 4,912,180

[45] Date of Patent: Mar. 27, 1990

[54] PROCESS FOR THE PREPARATION OF POLYARYLENE SULPHIDES

[75] Inventors: Ernst-Ulrich Dorf; Hans-Rudolph Dicke; Volker Eckhardt; Joachim Genz, all of Krefeld, Fed. Rep. of Germany

[73] Assignee: Bayer Aktiengesellschaft, Leverkusen, Fed. Rep. of Germany

[21] Appl. No.: 266,517

[22] Filed: Nov. 3, 1988

[30] Foreign Application Priority Data

Nov. 11, 1987 [DE] Fed. Rep. of Germany ....... 3738276

[51] Int. Cl.$^4$ .............................................. C08G 75/14
[52] U.S. Cl. ....................... 526/62; 528/14; 528/20; 528/21; 528/30; 528/388
[58] Field of Search ........................ 528/14, 13, 30, 20, 528/388, 21; 526/62

[56] References Cited

U.S. PATENT DOCUMENTS 3,919,177 11/1975 Campbell ........................ 528/388

FOREIGN PATENT DOCUMENTS 0088831 9/1983 European Pat. Off. .
0179380 4/1986 European Pat. Off. .

*Primary Examiner*—John C. Bleutge
*Assistant Examiner*—David W. Woodward
*Attorney, Agent, or Firm*—Connolly and Hutz

[57] ABSTRACT

This invention relates to a process for the preparation of polyarylene sulphides by melt condensation, in which the sulphide bridges of the polymer are formed by the splitting off of a compound which is volatile under the reaction conditions.

10 Claims, No Drawings

PROCESS FOR THE PREPARATION OF POLYARYLENE SULPHIDES

This invention relates to a process for the preparation of polyarylene sulphides by melt condensation, in which the sulphide bridges of the polymer are formed by the splitting off of a compound which is volatile under the reaction conditions.

Polyarylene sulphides (PAS) and processes for their preparation are known (from halogen thiophenolates, e.g. U.S.-PS No. 32 74 165, J. Polymer Sci. 58 (1962) 351-367; from sodium sulphide and dihalogenated aromatic compounds: e.g. U.S.-PS No. 33 54 129).

These processes have the disadvantage that they require the use of solvents. Added to the cost of the solvent are also the use of expensive apparatus for carrying out the reaction, recovery cycles for recovering the solvent, expensive procedures for working up the sodium chloride formed as by-product and a completely separate step for granulating the product.

The process according to this invention avoids these disadvantages since halogenated arylthiosilanes can be condensed solvent-free. Another advantage of this process is that condensation under the reaction conditions gives rise to volatile decomposition products which can escape from the reaction vessel. The PAS is obtained as a very pure melt.

The process according to the invention is characterised in that halogenated arylthiosilanes corresponding to formula (I)

$$\text{Hal-Ar-S-SiR}_3 \tag{I},$$

in which

Hal stands for halogen such as F or Cl,

Ar stands for two-bonded mononuclear or condensed $C_6$-$C_{24}$-aromatic groups or heterocyclic groups containing up to 3 hetero atoms such as N, O or S or two-bonded aromatic or heterocyclic units which may be attached by a single bond and/or by two-bonded $C_6$-$C_{24}$-aromatic groups or heterocyclic groups and/or by way of one or more units selected from O, $NR^1$, $CR^1{}_2$, S, S(O), S(O)$_2$, C(O), C(O)—O, C—(O)—$NR^1$ or [C(O)—]$_2$N  ($R^1$=$C_1$-$C_4$-alkyl, $C_5$-$C_{10}$-cycloalkyl, $C_6$-$C_{24}$-aryl or $C_7$-$C_{30}$-aralkyl or alkaryl), and the individual aromatic rings may carry 1 to 4 substituents $R^2$ selected from the groups mentioned under $R^1$ and/or $OR^1$, $NR^1$, $CR^1{}_3$, $SR^1$, S(O)—$R^1$, S(O)$_2$—$R^1$, C(O—)—$R^1$, C(O)—O—$R^1$ and C(O)—$NR^1{}_2$, and R stands for $C_1$-$C_4$-alkyl or $C_5$-$C_{20}$-cycloalkyl are reacted at temperatures of 150° to 400° C. optionally in the presence of from 0.01 to 1% by weight (based on the quantity of starting materials of formula (I)) of at least one alkali metal halide and/or alkaline earth metal halide or ammonium halide as catalyst and optionally in the presence of from 0.01 to 1% by weight (based on the quantity of the starting materials of formula (I)) of a conventional phase transfer catalyst as cocatalyst, with the elimination of halogenated trialkylsilane or halogenated (tris)cycloalkylsilane.

The process according the invention can be performed e.g. in an apparatus in which all parts which come into contact with the (hot) reaction mixture (walls, stirring equipment etc.), are made out of materials or coated with materials which do not release heavy metal ions. Preferred materials are glass, titanium, zirconium etc. If those materials are used, no catalyst or co-catalyst must be present in the reaction mixture.

In case the inventive process is carried out in an apparatus made for example from stainless steel, the presence of catalysts and co-catalysts can be advantageous.

The reaction vessel can also be made out of different materials, e.g. partially out of glass and partially out of titanium etc. The apparatus can be made out of titanium and glass etc.

The pressure may be from 0.3 to about 4 bar. The reaction may be carried out batchwise or continuously. The reaction vessel is advantageously equipped with a device for condensing the halogenated trialkylsilane or halogenated (tris)cycloalkylsilane which may be used again for the preparation of the starting material.

Apparatus for processing the polymer, such as extruders, kneaders, etc. may be directly attached to the reaction vessel or integrated with the reaction vessel.

The polymerisation reaction may be influenced by varying the starting materials. For example, the building up of the chain may be controlled by the addition of certain monofunctional compounds corresponding to formula (II) and/or formula (III)

$$R^3\text{—Ar—S—SiR}_3 \tag{II},$$

$$\text{Hal—Ar—}R^3 \tag{III},$$

in which $R^3$ stands for $R^2$ or H and

R, $R^2$, Hal and Ar have the meanings indicated for formula (I).

An additional increase in molecular weight up to cross-linking may be obtained by using trifunctional starting materials.

The process according to the invention is also suitable for the preparation of block copolymers in which the blocks are formed by the homopolymerisation of various starting materials of different structures before they are joined together.

The process according to the invention may be carried out in the presence of additives and diluents which remain inert under the reaction conditions (for example, aprotic organic solvents such as N-alkyl-lactams, N,N'-dialkyl-N,N'-alkyleneureas, diphenylethers, biphenyl etc.), polymers or inorganic inert materials.

The following are examples of halogenated arylthiosilanes of formula (I) which may be used according to the invention: 4-Chlorophenyl-trimethylsilylthioether, 3-chlorophenyl-trimethylsilylthioether, 4-fluorophenyl-trimethylsilylthioether, 3-fluorophenyl-trimethylsilylthioether, 4-chloro-4'-(trimethylsilylthio)biphenyl, 4-fluoro-4'-(trimethylsilylthio)biphenyl, 4-chloro-4'-(trimethylsilylthio)benzophenone, 4-fluoro-4'-(trimethylsilylthio)benzophenone, etc.

4-Chlorophenyl-trimethylsilylthioether, 3-chlorophenyltrimethylsilylthioether and 4-chloro-4'-(trimethylsilylthio)biphenyl are preferred.

(Phenylthio)-trimethylsilane and 4-(trimethylsilylthio)-diphenylsulphide, etc. are examples of monofunctional compounds of formula (II) suitable for the process according to the invention.

The following are examples of monofunctional compounds of formula (III) suitable for this invention: 4-Chlorodiphenyl, 1-chloronaphthalene, 2-chloronaphthalene, 4-chlorodiphenylsulphide, 4-chlorodiphenylether, 4-fluorodiphenyl, 1-fluoronaphthalene, 2- fluoronaphthalene, 4-fluorodiphenylsulphide, 4-fluorodiphenylether, etc.

The following are preferred: 4-Chlorodiphenyl, 4-chlorodiphenylsulphide and 4-chlorodiphenylether.

Examples of catalysts which may be used according to the invention include ammonium chloride, ammonium fluoride, lithium chloride, lithium fluoride, sodium chloride, sodium fluoride, potassium chloride, sodium bromide, potassium fluoride, potassium iodide, rubidium chloride, rubidium fluoride, caesium chloride, caesium fluoride, calcium chloride, calcium fluoride, etc.

Preferred catalysts are the fluorides of the alkali metals (e.g. Na, K, Cs) and alkaline earth metals (e.g. Mg, Ca) and ammonium fluoride.

Potassium fluoride, caesium chloride and caesium fluoride are particularly preferred.

18-Crown-6, dibenzo-18-crown-6, etc. are examples of phase transfer catalysts suitable for use as cocatalysts according to the invention.

The melt flow of polyarylene sulphides is generally determined according to ASTM 1238-70 at 316° C. using a 5 kg weight and given in terms of g/10 min.

If the melt flow is high, however, this measurement may give rise to difficulties owing to the high outflow rate of the polymer melt. For this reason, the fusion viscosity $n_m$ of the polymer melt (in Pa.s) at 306° C. has been determined in dependence on the shear stress (in Pa) by means of an Instron rotation viscosimeter.

This enables the fusion viscosity to be determined within the very wide range of from $10^1$ to $10^7$ Pa.s. In the Instron rheometer, the polymer is melted between a solid plate and a rotatable cone and the torque of the cone is determined. The fusion viscosity in dependence upon the shear stress can be calculated from the torque, the angular velocity and the data of the apparatus. The rheometer used was Model 3250 of Instron. The fusion viscosity was given as the value obtained at a shear stress of $\tau 10^2$ Pa.

The polyarylene sulphides according to the invention generally have melt viscosities of from $0.1 \cdot 10^1$ to $5 \cdot 10^4$ Pa.s immediately after their preparation, preferably from $0.1 \cdot 10^1$ to $1.5 \cdot 10^3$ Pa.s.

The polyarylene sulphides according to the invention may be mixed with other polymers, pigments and fillers such as graphite, metal powder, glass, powder, quartz powder, fused quartz, glass fibres or carbon fibres immediately after their synthesis and the usual stabilizers or mould release agents for polyarylenesulphides may be added. The polyarylene sulphides may be immediately processed by extrusion, extrusion blowing, injection moulding or other conventional processing techniques to produce films, fibres or moulded articles.

These may be used for the usual purposes, e.g. as motor car parts, mountings and fittings, electrical parts such as switches, electronic panels, electronic components, chemically resistant and weather resistant parts and apparatus such as pump housings and pump impellers, dishes for etching baths, sealing rings, parts of office machinery and telecommunication equipment and household appliances, etc.

EXAMPLE 1

25 g of 4-Chlorophenyl-trimethylsilylthioether and 100 mg of caesium fluoride are introduced into a stirrer apparatus at 165° C. and heated stepwise. The mixture begins to boil at a temperature of 270° C. After 14 hours of steady temperature rise to 340° C., during which a readily volatile condensate evaporates off and reflux gradually ceases, the reaction mixture is left to get cold. Trimethylchlorosilane can be detected in the condensate. The melt cake is broken down and taken up with isopropanol and washed. 9.8 g (=68%) of a grey powder having a melt viscosity of 2 Pa.s and a melting point of 255° C. are left after drying in a vacuum.

We claim:

1. Process for the synthesis of polyarylene sulphides, characterized in that halogenated arylthiosilanes corresponding to formula (I)

$$\text{Hal}-\text{Ar}-\text{S}-\text{SiR}_3 \qquad (I)$$

wherein
Hal stands for halogen,
Ar stands for divalent mononuclear or condensed $C_6$–$C_{24}$-aromatic groups or heterocyclic groups containing up to 3 hetero atoms or two single-bonded aromatic or heterocyclic units which is attached by a single bond or by divalent $C_6$–$C_{24}$-aromatic or heterocyclic bridging groups or by one or more bridging units O, $NR^1$, $CR^1_2$, S, S(O), $S(O)_2$, C(O), C(O)—O, C—(O)—$NR^1$, or $[C(O)-]_2N$
wherein
$R^1$ is $C_1$–$C_4$-alkyl, $C_5$–$C_{10}$-cycloalkyl, $C_6$–$C_{24}$-aryl or $C_7$–$C_{30}$-aralkyl or $C_7$–$C_{30}$ alkaryl, and the individual aromatic rings are unsubstituted or substituted by 1 to 4 substituents $R^2$, wherein $R^2$ is $R^1$, $OR^1$, $NR^1$, $CR^1_3$, $SR^1$, $S(O)$—$R^1$, $S(O)_2$—$R^1$, $C(O)$—$R^1$, $C(O)$—O—$R^1$ or $C(O)$—$NR^1_2$, and
R stands for $C_1$–$C_4$-alkyl or $C_5$–$C_{20}$-cycloalkyl, are reacted in the presence of from 0.01 to 1% by weight, based on the quantity of the starting materials corresponding to formula (I), of at least one alkali metal halide or alkaline earth metal halide or ammonium halide as catalyst, at temperatures from 150° to 400° C. with the splitting off of halogen trialkylsilane or halogen-(tris)-cycloalkylsilane so as to form said polyarylene sulphide.

2. Process according to claim 1, characterized in that the catalyst is at least one alkali metal fluoride, alkaline earth metal fluoride or ammonium fluoride.

3. Process according to claim 1, characterized in that the reaction is carried out in the presence of 0.01 to 1% by weight, based on the quantity of compound corresponding to formula (I), of a cocatalyst which is a conventional phase transfer catalyst.

4. Process according to claim 1, characterised in that cesium fluoride is the catalyst.

5. Process according to claim 1, characterised in that cesium chloride is the catalyst.

6. Process according to claim 1, characterised in that potassium fluoride is the catalyst and the crown ether, 18-crown-6, is the cocatalyst.

7. Process according to claim 1, characterized in that the (halogenarylthio)silane of formula (I) is 4-chlorophenyl-trimethylsilylthioether.

8. Process according to claim 1, characterised in that the apparatus in which all parts which come into contact with the (hot) reaction mixture are made out of materials or are coated with materials which do not release heavy metal ions.

9. Process according claim 8, characterised in that no catalyst or co-catalyst is used.

10. Process according to claim 8, characterised in that the reaction apparatus is made out of titanium or glass or both.

* * * * *

UNITED STATES PATENT AND TRADEMARK OFFICE
CERTIFICATE OF CORRECTION

PATENT NO.　:　4,912,180

DATED　　　:　March 27, 1990

INVENTOR(S):　Ernst-Ulrich Dorf; Hans-Rudolph Dicke; Volker Eckhardt; Joachim Genz It is certified that error appears in the above-identified patent and that said Letters Patent is hereby corrected as shown below:

Column 3, line 29, "fusion" should correctly read --melt--;

Column 3, line 33, "fusion" should correctly read --melt--;

Column 3, line 36, "fusion" should correctly read --melt--.

Signed and Sealed this

Third Day of September, 1991

Attest:

HARRY F. MANBECK, JR.

*Attesting Officer*　　　*Commissioner of Patents and Trademarks*